US010680261B2

(12) United States Patent
Bozzolo et al.

(10) Patent No.: US 10,680,261 B2
(45) Date of Patent: Jun. 9, 2020

(54) FUEL CELL SYSTEMS WITH IN-BLOCK REFORMING

(71) Applicant: LG Electronics, Inc., Seoul (KR)

(72) Inventors: Michele Bozzolo, Derby (GB); Robert Hay Cunningham, Derby (GB); Gary John Saunders, Derbyshire (GB)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 15/794,222

(22) Filed: Oct. 26, 2017

(65) Prior Publication Data

US 2019/0131640 A1    May 2, 2019

(51) Int. Cl.
| | |
|---|---|
| *H01M 8/04276* | (2016.01) |
| *H01M 8/04014* | (2016.01) |
| *H01M 8/04082* | (2016.01) |
| *H01M 8/2484* | (2016.01) |
| *H01M 8/10* | (2016.01) |
| *H01M 8/2465* | (2016.01) |
| *H01M 8/124* | (2016.01) |

(52) U.S. Cl.
CPC ... *H01M 8/04276* (2013.01); *H01M 8/04022* (2013.01); *H01M 8/04201* (2013.01); *H01M 8/10* (2013.01); *H01M 8/2465* (2013.01); *H01M 8/2484* (2016.02); *H01M 2008/1293* (2013.01)

(58) Field of Classification Search
CPC .. H01M 8/04298; H01M 8/10; H01M 8/2465; H01M 8/0637; H01M 8/0618; H01M 8/04097
See application file for complete search history.

(56) References Cited

U.S. PATENT DOCUMENTS

| 8,241,813 B2 | 8/2012 | Townsend et al. |
| 2004/0183849 A1 | 9/2004 | Kawakoto |
| | (Continued) | |

FOREIGN PATENT DOCUMENTS

| EP | 2565970 | 3/2013 |
| GB | 2494666 | 3/2013 |
| | (Continued) | |

OTHER PUBLICATIONS

Thomas S. Christensen. "Adiabatic prereforming of hydrocarbons—an important step in syngas production." Applied Catalysis A: General 138 (1996) 285-309 (Year: 1996).*

(Continued)

*Primary Examiner* — Michael L Dignan
(74) *Attorney, Agent, or Firm* — Dentons US LLP

(57) ABSTRACT

A fuel cell system and corresponding methods are provided. The fuel cell system includes a fuel cell stack configured for in-block reforming, as well as a pre-reformer. The fuel cell stack may include a plurality of fuel cells. The fuel cell stack may also include a fuel supply manifold, a fuel exhaust manifold, an oxidant supply manifold, and an oxidant exhaust manifold. The fuel supply manifold may be configured to receive fuel, and to supply the fuel to the fuel cell stack for in-block reforming. The fuel exhaust manifold may be configured to expel fuel exhaust from the fuel cell stack. The oxidant supply manifold may be configured to receive an oxidant and to supply the oxidant to the fuel cell stack for in-block reforming. The oxidant exhaust manifold may be configured to expel oxidant exhaust from the fuel cell stack.

14 Claims, 4 Drawing Sheets

(56) References Cited

U.S. PATENT DOCUMENTS

| | | | |
|---|---|---|---|
| 2006/0019139 A1 | 1/2006 | Matsui et al. | |
| 2006/0166054 A1* | 7/2006 | Ahmed | H01M 8/0612 429/425 |
| 2007/0072017 A1 | 3/2007 | Hansen et al. | |
| 2011/0053027 A1* | 3/2011 | Weingaertner | F28D 9/005 429/440 |
| 2012/0315559 A1 | 12/2012 | Noh et al. | |
| 2013/0101873 A1 | 4/2013 | Dionne et al. | |
| 2014/0342256 A1 | 11/2014 | Modarresi et al. | |
| 2015/0030947 A1 | 1/2015 | Saunders et al. | |
| 2015/0263362 A1 | 9/2015 | Yakumaru | |
| 2016/0006057 A1* | 1/2016 | Nakamoto | H01M 8/0662 429/429 |
| 2017/0025696 A1 | 1/2017 | Bozzolo et al. | |
| 2017/0054168 A1 | 2/2017 | Budge et al. | |
| 2018/0151895 A1 | 5/2018 | Butler et al. | |

FOREIGN PATENT DOCUMENTS

| | | | |
|---|---|---|---|
| JP | H02170368 | 7/1990 | |
| JP | H07230816 | 8/1995 | |
| JP | 2004199997 | 7/2004 | |
| JP | 2014154296 | 8/2014 | |
| JP | 2015516641 | 6/2015 | |
| JP | 2016192334 | 11/2016 | |
| JP | 2017525099 | 8/2017 | |
| KR | 10-20050058327 | 6/2005 | |
| KR | 10-20160143673 | 12/2016 | |
| WO | 2005/064730 | 7/2005 | |
| WO | 2017031337 | 2/2014 | |
| WO | WO2015155540 | * 10/2015 | H01M 8/06 |
| WO | 2018/085333 | 5/2018 | |
| WO | 2018/085437 | 5/2018 | |

OTHER PUBLICATIONS

Peters et al. "Pre-reforming of natural gas in solid oxide fuel-cell systems" Journal of Power Sources 86 (2000) 432-44 (Year: 2000).*
Peters et al. "Internal reforming of methane in solid oxide fuel cell systems." Journal of Power Sources 106 (2002) 238-244 (Year: 2002).*
Tsai et al. "Methane internal reforming in solid oxide fuel cells with anode off-gas recirculation." International Journal of Hydrogen Energy 41 (2016) 553-561 (Year: 2016).*
Search Report of United Kingdom Patent Office in Appl'n No. GB1817394.8, dated Apr. 18, 2019.

* cited by examiner

FUEL CELL SYSTEMS WITH IN-BLOCK REFORMING

RELATED APPLICATIONS

The present application is related to U.S. patent application Ser. No. 15/794,227, entitled Methods of Operating Fuel Cell Systems with In-Bock Reforming, filed on Oct. 26, 2017, and is incorporated herein by reference.

FIELD

This disclosure generally relates to fuel cell systems and, more specifically, to fuel cell systems with in-block reforming of fuel and corresponding methods.

BACKGROUND

A fuel cell stack is an electrochemical system in which a fuel (such as hydrogen) is reacted with an oxidant (such as oxygen) at high temperature to generate electricity. The fuel cell stack may include multiple fuel cells where each fuel cell has an anode, a cathode, and an electrolyte. The fuel cell stack is typically supported by a system of components such as reformers, heat exchangers, ejectors, combustors, fuel and oxidant sources, and other components. For example, a source of unreformed fuel may be supplied via a fuel ejector to a fuel cell system reformer. The reformer may partially or completely reform the fuel using a steam method, a dry method, or another reforming method to produce a reformate that is supplied to anodes of a fuel cell. For example, in steam reforming of natural gas—sometimes referred to as steam methane reforming (SMR)—steam reacts with methane at high temperatures (600° C.-1100° C.) and in the presence of a metal-based catalyst to yield carbon monoxide and hydrogen ($CH_4+H_2O \leftrightarrow CO+3H_2$). Steam reforming may also convert higher hydrocarbons by the same process ($C_2H_6+2H_2O \leftrightarrow 2CO+5H_2$), unless those higher hydrocarbons have already been removed from the process gas stream by another process (e.g. pre-reforming). The fuel cell may expel fuel exhaust from the anode and supply the exhaust to either a suction of a fuel ejector or an auxiliary system.

In addition, an oxidant supply provides an oxidant to the cathodes of the fuel cell. The fuel cell may expel oxidant exhaust, such as unused oxidant, from the cathode. To facilitate the reformation of the unreformed fuel, the fuel cell system may provide a heat input to the reformer by supplying the cathode exhaust, or some other hot fluid, to the reformer. After transferring its heat into the reforming fuel, cathode exhaust may be supplied to an auxiliary system, recycled back to the cathodes of the fuel cell via an oxidant air ejector, or both.

The temperature of recycled and fresh oxidant supplied to the cathodes will increase due to heat input as it passes through the fuel cell stack. However, the heat input into the oxidant may be insufficient to maintain the oxidant in thermal equilibrium as it flows through the fuel cell system. This is due to, for example, the relatively large amount of heat input needed to support the reformation of the hydrocarbon fuel. To thermally balance the oxidant as it flows through the fuel cell stack, a heat exchanger may be introduced into the fuel cell system, typically upstream of a cathode inlet. The heat exchanger may be supplied with combustion products to create a reaction that produces heat. The combustion products may include fuel exhaust, such as unused fuel, and cathode exhaust. The reaction may occur in the heat exchanger or in another component such as, e.g., a combustor located upstream of the heat exchanger.

In this configuration, the oxidant typically is maintained in thermal equilibrium as it flows through the fuel cell system during normal operations. The heat generated within the fuel cell stack, the heat transferred into the fuel in the reformer, the cooling effect of the oxidant mixing at the cathode ejector, and the heat input from a heat exchanger will balance to maintain this thermal equilibrium; in fact, a heat exchanger upstream of the cathode inlet is sized for such a purpose.

One type of fuel cell is the solid oxide fuel cell (SOFC). The basic components of a SOFC may include an anode, a cathode, a solid electrolyte, and an interconnect. The fuel may be supplied to the anode, and the oxidant may be supplied to the cathode of the fuel cell. At the cathode, electrons ionize the oxidant. The electrolyte may include a material that allows the ionized oxidant to pass there through to the anode while simultaneously being impervious to the fluid fuel and oxidant. At the anode, the fuel is combined with the ionized oxidant in a reaction that releases electrons which are conducted back to the cathode through the interconnect. Heat generated from ohmic losses is removed from the fuel cell by either a fuel (i.e., anode) exhaust or an oxidant (i.e., cathode) exhaust, or heat is radiated to the environment.

The anode of a SOFC may be a mixed cermet comprising nickel and zirconia (such as, e.g., yttria stabilized zirconia (YSZ)) or nickel and ceria (such as, e.g., gadolinia dope ceria (GDC)). Nickel, and other materials, may function not only to support the chemical reaction between the fuel and the ionized oxidant but may have catalytic properties which allow the anode to reform a hydrocarbon fuel within the fuel cell. One method of reforming the hydrocarbon fuel is steam reforming of methane ($CH_4$), an endothermic reaction (Equation 1):

$$CH_4+H_2O \rightarrow CO+3H_2 \quad \Delta H°=206.2 \text{ kJ/mole} \qquad \text{(Equation 1)}$$

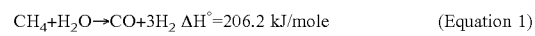

Alternative methods of reforming are also available. For example, the hydrocarbon fuel may be reformed by carbon dioxide reforming (also known as dry reforming) (Equation 2):

$$CO_2+CH_4 \rightarrow 2H_2+2CO \qquad \text{(Equation 2)}$$

A SOFC may be structured, e.g., as a segment-in-series or in-plane series arrangement of individual cells. The oxidant is typically introduced at one end of the series of fuel cells via an oxidant inlet and flows over the remaining fuel cells until reaching a cathode exhaust outlet. Each fuel cell transfers heat into the oxidant thereby raising its temperature. A temperature gradient can develop in the fuel cell which increases from the oxidant inlet to the oxidant exhaust outlet. These temperature gradients can cause thermal stresses on the fuel cell, leading to material degradation or failure of fuel cell components. In addition, the thermal stresses on the fuel cell can reduce fuel cell performance. Some fuel cell systems attempt to alleviate these issue with the use of in-block reforming (IBR), where a portion of the fuel is reformed within the fuel cell stack. However, these systems typically still require a reformer as well as a heat exchanger. Thus, there are opportunities for improvements to fuel cell systems configured for internal block reforming.

SUMMARY

In accordance with some embodiments of the present disclosure, a fuel cell system is provided. The fuel cell system may include a source of fuel and a source of oxidant. The fuel cell system also includes a fuel cell stack configured for IBR, an anode ejector, and a pre-reformer. The fuel cell stack may include a plurality of fuel cells, each fuel cell including an anode, a cathode, and an electrolyte. The fuel cells may be SOFCs. The fuel cell stack may also include a fuel supply manifold, a fuel exhaust manifold, an oxidant supply manifold, and an oxidant exhaust manifold. The fuel supply manifold may be configured to receive fuel, and to supply the fuel to the anodes of the plurality of fuel cells. The fuel exhaust manifold may be configured to expel fuel exhaust from the fuel cell stack. The oxidant supply manifold may be configured to receive an oxidant and to supply the oxidant to the cathodes of the plurality of fuel cells, and the oxidant exhaust manifold may be configured to expel oxidant exhaust from the fuel cell stack.

The anode ejector of the fuel cell system may be configured to receive fuel from a source of fuel, to receive a portion of exhaust from the fuel cell stack, and to supply a stream of fuel that includes at least a portion of one or more of the received fuel and the received portion of the exhaust. In some examples, the anode ejector is configured to supply the stream of fuel based on a recycle ratio of at least 7.5 (i.e., 750%). The recycle ratio is the ratio (by mass) of the amount of the received portion of recycled fuel, in this example the fuel exhaust, to the amount of received fuel that is provided as the stream of fuel. In some examples, the anode ejector is configured to supply the stream of fuel based on a recycle ratio range between 4.5 and 15 (i.e., 450% and 1500%). In other examples, the anode ejector is configured to supply the stream of fuel based on a recycle ratio range between 6 and 8 (i.e., 600% and 800%). In some examples, the anode ejector is configured to receive a portion of fuel exhaust from the fuel cell stack without passing through a heat exchanger.

As mentioned above the fuel cell system may also include a pre-reformer. The pre-reformer can be disposed between an outlet of the anode ejector and the fuel supply manifold, and may be configured to remove higher hydrocarbons from the stream of fuel received from the anode ejector. The pre-reformer may also be configured to provide the pre-reformed fuel to the fuel supply manifold. In some examples, the pre-reformer supplies the pre-reformed fuel directly to the fuel supply manifold. In some examples, the pre-former can be an adiabatic catalytic converter configured to remove the higher hydrocarbons with no heat input other than heat from the stream of fuel from the anode ejector.

In some embodiments, the fuel cell system may also include an auxiliary ejector. For example, the auxiliary ejector may be configured to receive a portion of fuel exhaust from the fuel cell stack, and to receive oxidant exhaust from the oxidant exhaust manifold. In some embodiments the fuel cell system also includes a combustor configured to receive fuel exhaust from the fuel cell stack as well as oxidant exhaust from the auxiliary ejector. In some embodiments the fuel cell system may also include a turbine configured to receive exhaust from the combustor.

In some examples, the fuel cell system includes a heat exchanger located either upstream or downstream of the cathode ejector. The heat exchanger may transfer heat from the exhaust of the auxiliary ejector to the oxidant supply. In some examples, the fuel cell system includes no heat exchangers.

In some embodiments, the fuel cell system may include a compressor configured to receive oxidant from the oxidant source. In some embodiments, the fuel cell system may also include a cathode ejector, where the cathode ejector may be configured to receive oxidant from the compressor, receive oxidant exhaust from the oxidant exhaust manifold of the fuel cell stack, and supply the received oxidants, in various proportions, to the oxidant inlet manifold of the fuel cell stack. In some examples the oxidant exhaust from the cathode ejector is supplied to the oxidant inlet manifold of the fuel cell stack without passing through a heat exchanger.

In accordance with some embodiments of the present disclosure, a solid oxide fuel cell system is provided. The solid oxide fuel cell system may include a solid oxide fuel cell stack configured for IBR that includes at least one solid oxide fuel cell, where each solid oxide fuel cell includes an anode, a cathode, and an electrolyte.

The solid oxide fuel cell system may also include an anode loop for supplying fuel and reformate to the anode of each solid oxide fuel cell. The anode loop may include a fuel inlet manifold, a fuel exhaust manifold, a fuel source, an anode ejector, and a pre-reformer. The fuel inlet manifold may be configured to supply fuel to the anode of each solid oxide fuel cell. The fuel exhaust manifold may be configured to receive fuel exhaust, such as unused fuel or partially depleted reformed fuel, from the anode of each solid oxide fuel cell. The anode ejector may be configured to receive fuel from the fuel source and from the fuel exhaust manifold, and to supply a stream of fuel that includes at least a portion of one or more of the received fuels from the fuel source and the fuel exhaust manifold. In some examples, the anode ejector is configured to supply the stream of fuel based on a recycle ratio of at least 7.5. In some examples, based on the recycle ratio, for example 7.5, the anode ejector supplies a stream of fuel that contains less than approximately 11% methane. The pre-reformer can be disposed between an outlet of the anode ejector and the solid oxide fuel cell stack, and may be configured to remove higher hydrocarbons from the stream of fuel received from the anode ejector.

The solid oxide fuel cell system may also include a cathode loop for supplying oxidant to the cathode of each solid oxide fuel cell. The cathode loop may include an oxidant inlet manifold, an oxidant exhaust manifold, and an oxidant source. The oxidant inlet manifold may be configured to supply oxidant to the cathode of each solid oxide fuel cell, and the oxidant exhaust manifold may be configured to receive oxidant exhaust from each cathode of the solid oxide fuel cells.

In some embodiments, the solid oxide fuel cell system includes a compressor configured to receive oxidant from the source of oxidant. In some examples, the cathode loop may also include a cathode ejector. The cathode ejector may be configured to receive oxidant from the compressor, receive oxidant exhaust from the oxidant exhaust manifold of the fuel cell stack, and supply the received oxidants, in various proportions, to the oxidant inlet manifold of the fuel cell stack.

The solid oxide fuel cell system may also include an auxiliary loop for combusting a portion of the fuel exhaust from the fuel exhaust manifold and a portion of the oxidant exhaust from the oxidant exhaust manifold. In some examples, the auxiliary loop may include an auxiliary ejector and a combustor. The auxiliary ejector may be configured to receive a portion of the oxidant exhaust from the oxidant exhaust manifold, to receive a portion of oxidant from the oxidant source, and to receive a portion of fuel exhaust from the fuel exhaust manifold. The combustor may be configured to receive the exhaust from the auxiliary ejector. In some embodiments, the solid oxide fuel cell system includes a turbine configured to receive the exhaust from the combustor.

In some embodiments, a fuel cell system including a fuel cell block, an out-of-block oxidant flowpath, and an out-of-block fuel flowpath is provided. The fuel cell block includes a fuel cell stack comprising a plurality of solid oxide fuel cells, each solid oxide fuel cell comprising an anode, a cathode, and an electrolyte. The fuel cell block may also include an in-block fueling flowpath that includes a fuel supply manifold, a fuel exhaust manifold, and one or more fueling channels in fluid communication with the fuel supply manifold and the fuel exhaust manifold, where each anode is exposed to a fuel flowing in one or more of the fueling channels. The fuel cell block may also include an in-block oxidizing flowpath that includes an oxidant supply manifold, an oxidant exhaust manifold, and one or more oxidizing channels in fluid communication with the oxidant supply manifold and the oxidant exhaust manifold, where each cathode is exposed to an oxidant flowing in one or more oxidizing channels.

The out-of-block oxidant flowpath may include a cathode ejector having an oxidant supply input, an oxidant recycle input, and a combined oxidant output. For example, the combined oxidant output may provide a mixture of oxidant received via the oxidant supply input, and recycled oxidant received via the oxidant recycle input. The out-of-block oxidant flowpath may also include an oxidant supply conduit in fluid communication with the cathode ejector oxidant supply input, an oxidant source in fluid communication with the oxidant supply conduit, an oxidant recycle conduit in fluid communication with the cathode ejector oxidant recycle input and the in-block oxidizing flowpath oxidant exhaust manifold. The out-of-block flowpath may also include a combined oxidant supply conduit in fluid communication with the cathode ejector combined oxidant output and the in-block oxidizing flowpath oxidant supply manifold.

The out-of-block fuel flowpath may include an anode ejector having a fuel supply input, a fuel recycle input, and a combined fuel output. For example, the combined fuel output may provide a combined fuel based on fuel received via the fuel supply input and recycled fuel received via the fuel recycle input. The out-of-block flowpath may also include a fuel supply conduit in fluid communication with the anode ejector fuel supply input, a source of fuel in fluid communication with the fuel supply conduit, a fuel recycle conduit in fluid communication with the anode ejector fuel recycle input and the in-block fueling flowpath fuel exhaust manifold, and a combined fuel supply conduit in fluid communication with the anode ejector combined fuel output and the in-block fueling flowpath fuel supply manifold.

In some examples, the out-of-block fuel flowpath along with the in-block fueling flowpath are configured to effect a recycle ratio in the range of 6:1 to 8:1 of a mass of fuel flowing into the anode ejector fuel recycle input to a mass of fuel flowing into the anode ejector fuel supply input. In other examples, the out-of-block fuel flowpath along with the in-block fueling flowpath are configured to effect a recycle ratio in the range of 4.5:1 to 15:1 of a mass of fuel flowing into the anode ejector fuel recycle input to a mass of fuel flowing into the anode ejector fuel supply input. In yet other examples, the out-of-block fuel flowpath along with the in-block fueling flowpath are configured to effect a recycle ratio of about 7.5:1 of a mass of fuel flowing into the anode ejector fuel recycle input to a mass of fuel flowing into the anode ejector fuel supply input.

In some examples, the out-of-block fuel flowpath along with the in-block fueling flowpath are configured to effect a weight percent of methane in a fluid flowing into the in-block fueling flowpath fuel supply manifold of no greater than eleven percent. In some examples, the out-of-block fuel flowpath along with the in-block fueling flowpath are configured to effect a weight percent of methane in a fluid flowing into the in-block fueling flowpath fuel supply manifold in the range of 0 to 11 percent.

In some examples, the fuel cell system includes an out-of-block auxiliary flowpath that includes an auxiliary ejector having an oxidant supply input, a fuel exhaust input, an oxidant exhaust input, a recycle input, and an output. The auxiliary flowpath further includes an oxidant supply conduit in fluid communication with the auxiliary ejector oxidant supply input and the oxidant source; a fuel exhaust conduit in fluid communication with the auxiliary ejector fuel exhaust input and the in-block fueling flowpath fuel exhaust manifold; an oxidant exhaust conduit in fluid communication with the auxiliary ejector oxidant exhaust input and the in-block oxidizing flowpath oxidant exhaust manifold; an auxiliary exhaust conduit in fluid communication with the auxiliary ejector output; and a recycle conduit in fluid communication with the auxiliary ejector recycle input and the auxiliary exhaust conduit.

In some examples, the auxiliary flowpath includes a combustor. In some examples, the fuel cell system includes a heat exchanger for transferring thermal energy between a fluid output of the combustor and a fluid flowing in the combined oxidant supply conduit. In some examples, the heat exchanger is located between a fluid output of the combustor and a fluid flowing in the oxidant supply conduit.

In accordance with some embodiments of the present disclosure, a fuel cell system includes a fuel cell stack, configured for IBR, that includes multiple compartments (e.g., segments). The fuel cell system may also employ multiple anode ejectors and pre-reformers. The fuel cell system may also include a source of fuel and a source of oxidant. The fuel cell system may also include a first anode ejector, a second anode ejector, a first pre-reformer, and a second pre-reformer. The fuel cell stack may include a plurality of fuel cells, each fuel cell including an anode, a cathode, and an electrolyte. The fuel cells may be SOFCs.

Each compartment of the fuel cell stack may include a fuel supply manifold and a fuel exhaust manifold. One compartment of the fuel cell stack may include an oxidant supply manifold, where another compartment of the fuel cell stack includes an oxidant exhaust manifold. The fuel supply manifold of each fuel cell stack may be configured to receive fuel, and to supply the fuel to the anodes of the plurality of fuel cells. The fuel exhaust manifold of each fuel cell stack may be configured to expel fuel exhaust from the fuel cell stack. The oxidant supply manifold of one compartment of the fuel cell stack may be configured to receive an oxidant and to supply the oxidant to the cathodes of the plurality of fuel cells, and the oxidant exhaust manifold of another compartment of the fuel cell stack may be configured to exhaust the oxidant from the fuel cell stack.

A first anode ejector of the fuel cell system may be configured to receive fuel from the source of fuel, to receive a portion of fuel exhaust from one compartment of the fuel cell stack, and to supply a first stream of fuel that includes at least a portion of one or more of the received fuel and the received portion of the fuel exhaust. The first stream of fuel may be supplied to, for example, a first pre-former. In some examples, the first anode ejector is configured to receive a portion of the fuel exhaust from a compartment of the fuel cell stack without passing through a heat exchanger.

The first pre-reformer can be disposed between an outlet of the first anode ejector and the fuel supply manifold, and may be configured to remove higher hydrocarbons from the first stream of fuel received from the first anode ejector. In some examples, the first pre-former can be an adiabatic catalytic converter configured to remove the higher hydrocarbons with no heat input other than heat from the stream of fuel from the first anode ejector.

A second anode ejector of the fuel cell system may be configured to receive fuel from the source of fuel, to receive a portion of fuel exhaust from another compartment of the fuel cell stack, and to supply a second stream of fuel that includes at least a portion of one or more of the received fuel and the received portion of the fuel exhaust. The second stream of fuel can be supplied to, for example, a second pre-former. In some examples, the second anode ejector is configured to receive a portion of the fuel exhaust from the other compartment of the fuel cell stack without passing through a heat exchanger.

The second pre-reformer can be disposed between an outlet of the second anode ejector and the fuel supply manifold, and may be configured to remove higher hydrocarbons from the second stream of fuel received from the second anode ejector. In some examples, the second pre-former can be an adiabatic catalytic converter configured to remove the higher hydrocarbons with no heat input other than heat from the stream of fuel from the second anode ejector.

In some examples, the first anode ejector is configured to supply the first stream of fuel based on a recycle ratio of at least 7.5. In some examples, the first anode ejector is configured to supply the first stream of fuel based on a recycle ratio range between 7.5 and 15. Similarly, in some examples, the second anode ejector is configured to supply the second stream of fuel based on a recycle ratio of at least 7.5. In some examples, the second anode ejector is configured to supply the second stream of fuel based on a recycle ratio range between 7.5 and 15.

In some embodiments, the first anode ejector and the second anode ejector are configured to supply the first stream of fuel and the second stream of fuel at respective recycle ratios such that the first stream of fuel and the second stream of fuel provide a combined fuel that contains less than approximately 11% methane. For example, the first anode ejector may be configured to supply the first steam of fuel based on a first ratio of the received first portion of exhaust to the received fuel, and the second anode ejector may be configured to supply the second steam of fuel based on a second ratio of the received portion of exhaust to the received fuel. In some examples, each of the first ratio and second ratio can be in the range of 7.5 to 15.

In some embodiments, the fuel cell system may also include an auxiliary ejector. For example, the auxiliary ejector may be configured to receive a portion of fuel exhaust from the fuel cell stack, and to receive the oxidant exhausted from the oxidant exhaust manifold. In some embodiments the fuel cell system also includes a combustor configured to receive fuel exhaust from the fuel cell stack as well as oxidant exhausted from the auxiliary ejector. In some embodiments the fuel cell system may also include a turbine configured to receive the exhaust from the combustor.

In some examples, the fuel cell system includes a heat exchanger located either upstream or downstream of the cathode ejector. The heat exchanger may transfer heat from the exhaust of the auxiliary ejector to the oxidant supply. For example, the heat exchanger may be configured to receive the exhaust of the auxiliary ejector, and to receive oxidant supplied from the cathode ejector. The heat exchanger can use then transfer heat from the exhaust of the auxiliary ejector to oxidant supply, and provide it to the oxidant inlet manifold of the fuel cell stack. Alternatively, the heat exchanger may be configured to receive oxidant from the source of oxidant, transfer heat from the exhaust of the auxiliary ejector to the oxidant, and provide the oxidant to the cathode ejector.

In some examples, a fuel cell system is provided that includes a fuel cell block, an out-of-block oxidant flowpath, a first out-of-block fuel flowpath, and a second out-of-block fuel flowpath. The fuel cell block may include a fuel cell stack with a first and a second segment, each segment including a plurality of solid oxide fuel cells, each solid oxide fuel cell comprising an anode, a cathode, and an electrolyte. The fuel cell block may also include a first in-block fueling flowpath including a first fuel supply manifold, a first fuel exhaust manifold, and one or more first fueling channels in fluid communication with the first fuel supply manifold and the first fuel exhaust manifold, where each anode in the first segment is exposed to a fuel flowing in one or more of the first fueling channels. The fuel cell block may further include a second in-block fueling flowpath including a second fuel supply manifold, a second fuel exhaust manifold, and one or more second fueling channels in fluid communication with the second fuel supply manifold and the second fuel exhaust manifold, where each anode in the second segment is exposed to a fuel flowing in one or more of the second fueling channels. The fuel cell block may also include an in-block oxidizing flowpath including an oxidant supply manifold, an oxidant exhaust manifold, and one or more oxidizing channels in fluid communication with the oxidant supply manifold and the oxidant exhaust manifold, where each cathode in the first and second segments is exposed to an oxidant flowing in one or more oxidizing channels.

The out-of-block oxidizing flowpath may include a cathode ejector having an oxidant supply input, an oxidant recycle input, and a combined oxidant output. The out-of-block oxidizing flowpath may also include an oxidant supply conduit in fluid communication with the cathode ejector oxidant supply input, an oxidant source in fluid communication with the oxidant supply conduit, and an oxidant recycle conduit in fluid communication with the cathode ejector oxidant recycle input and the in-block oxidizing flowpath oxidant exhaust manifold. The out-of-block oxidizing flowpath may also include a combined oxidant supply conduit in fluid communication with the cathode ejector combined oxidant output and the in-block oxidizing flowpath oxidant supply manifold.

The first out-of-block fuel flowpath may include a first anode ejector having a fuel supply input, a fuel recycle input, and a combined fuel output. The first out-of-block fuel flowpath may also include a first fuel supply conduit in fluid communication with the first anode ejector fuel supply input, a source of fuel in fluid communication with the first fuel supply conduit, and a first fuel recycle conduit in fluid communication with the first anode ejector fuel recycle input and the second in-block fueling flowpath fuel exhaust manifold. The first out-of-block fuel flowpath may also include a first combined fuel supply conduit in fluid communication with the first anode ejector combined fuel output and the first in-block fueling flowpath fuel supply manifold.

The second out-of-block fuel flowpath may include a second anode ejector having a fuel supply input, a fuel recycle input, and a combined fuel output. The second out-of-block fuel flowpath may also include a second fuel supply conduit in fluid communication with the second anode ejector fuel supply input, a source of fuel in fluid communication with the second fuel supply conduit, and a second fuel recycle conduit in fluid communication with the second anode ejector fuel recycle input and the first in-block fueling flowpath fuel exhaust manifold. The second out-of-block fuel flowpath may also include a second combined fuel supply conduit in fluid communication with the second anode ejector combined fuel output and the second in-block fueling flowpath fuel supply manifold.

In some examples, each of the first and second out-of-block fuel flowpaths and the first and second in-block fueling flowpaths are configured to effect a recycle ratio in the range of 7.5 to 15 of a mass of fuel flowing into the anode ejector fuel recycle input to a mass of fuel flowing into the anode ejector fuel supply input.

In some examples, the fuel cell system fuel cell block with a fuel cell stack including a first and a second segment includes an out-of-block auxiliary flowpath that includes an auxiliary ejector having an oxidant supply input, a fuel exhaust input, an oxidant exhaust input, a recycle input, and an output. The auxiliary flowpath may also include an oxidant supply conduit (e.g., supply line) in fluid communication with the auxiliary ejector oxidant supply input and an oxidant source. The auxiliary flowpath may also include a fuel exhaust conduit in fluid communication with the auxiliary ejector fuel exhaust input and the first in-block fueling flowpath fuel exhaust manifold, and an oxidant exhaust conduit in fluid communication with the auxiliary ejector oxidant exhaust input and the second in-block oxidizing flowpath oxidant exhaust manifold. The auxiliary flowpath may also include an auxiliary exhaust conduit in fluid communication with the auxiliary ejector output; and a recycle conduit in fluid communication with the auxiliary ejector recycle input and the auxiliary exhaust conduit.

In some examples, a fuel cell system includes a fuel cell stack that includes a plurality of solid oxide fuel cells each having an anode, a cathode, and an electrolyte. The fuel cell system may also include a fuel supply manifold, a fuel exhaust manifold, and one or more fueling channels providing a flowpath between the fuel supply and fuel exhaust manifolds. The one or more fueling channels are in fluid communication with the anodes of the plurality of fuel cells. The fuel cell system may also include a fueling system that includes a source of unreformed fuel, and an ejector having an input of unreformed fuel from the fuel source, an input of recycle fuel from the fuel exhaust manifold, and an output of combined fuels from the inputs that is provided to the fuel supply manifold. Additionally or alternatively, the fuel cell system may be configured such that the recycle ratio of the mass of recycle fuel to the mass of unreformed fuel is in the range of 4.5:1 to 15:1. Additionally or alternatively, the fuel cell system may be configured such that the output of the combined fuels provided to the fuel supply manifold includes no more than 11% by weight of methane. Additionally, or alternatively, the fuel cell system may be configured such that the temperature of the fluid entering the fuel supply manifold is no greater than the temperature of the combined fuels output from the ejector. For example, the fuel cell system may not include a heat exchanger between the output of the ejector and the fuel supply manifold that would otherwise provide thermal energy (i.e., heat) to the fuel flowing into the fuel supply manifold.

Corresponding methods are also contemplated. In some examples, a fuel cell system includes a fuel cell stack configured for in-block reforming. The method includes receiving, by a fuel supply manifold of the fuel cell stack, a fuel from a source of fuel. The method may also include receiving, by an oxidant supply manifold of the fell cell stack, an oxidant from a source of oxidant. The method may also include reforming, by the fuel cell stack, the received fuel with the received oxidant. In some examples, all fuel reforming of the fuel cell system is performed by the fuel cell stack (i.e., 100% in-block reforming). The method may also include expelling, by the fuel cell stack, fuel exhaust from the fuel cell stack. The method may also include expelling, by an oxidant exhaust manifold of the fuel cell stack, cathode exhaust, such as oxidant. The method may also include receiving, by an anode ejector, fuel from the source of fuel, and receiving, by the anode ejector, a first portion of the fuel exhaust from the fuel exhaust manifold. The method may also include supplying, by the anode ejector, a stream of fuel that includes at least a portion of one or more of the received fuel and the received first portion of the fuel exhaust. The method may also include removing, by a pre-reformer, higher hydrocarbons from a stream of fuel from the anode ejector; and providing, by the pre-reformer, the stream of fuel to the fuel supply manifold of the fuel cell stack for the in-block reforming.

In another example, a method for providing fuel to the anodes of a solid oxide fuel cell stack includes: drawing unreformed fuel from a fuel source; combining the unreformed fuel with at least a portion of the fuel exhausted from the fuel cell stack; pre-reforming the combined unreformed fuel and exhausted fuel; and reforming the unreformed fuel, wherein the improvement comprises reforming all of the unreformed fuel in the fuel cell stack.

In yet another example, a method in a fuel cell system includes expelling, by a fuel exhaust manifold of a fuel cell stack, fuel exhaust; expelling, by an oxidant exhaust manifold of the fuel cell stack, oxidant exhaust; receiving, by an anode ejector, fuel from a source of fuel; receiving, by the anode ejector, a first portion of the fuel exhaust from the fuel exhaust manifold; supplying, by the anode ejector, a stream of fuel comprising at least a portion of one or more of the received fuel and the received first portion of the fuel exhaust to a pre-reformer; removing, by the pre-reformer, higher hydrocarbons from the stream of fuel from the anode ejector; providing, by the pre-reformer, the stream of fuel to a fuel supply manifold of the fuel cell stack for in-block reforming; receiving, by an oxidant supply manifold of the fell cell stack, an oxidant from a source of oxidant; and in-block reforming, by the fuel cell stack, of the stream of fuel with the received oxidant, wherein all fuel reforming of the fuel cell system is performed by the fuel cell stack In some examples, the anode ejector supplies a stream of fuel including at least a portion of one or more of the received fuel and the received first portion of the fuel exhaust to a pre-reformer based on a recycle ratio range, such as a range of 7.5 to 15, of a mass of the first portion of the fuel exhaust from the fuel exhaust manifold to a mass of the fuel from the source of fuel. In another example, the anode ejector supplies a stream of fuel including at least a portion of one or more of the received fuel and the received first portion of the fuel exhaust to a pre-reformer, where a weight percent of methane in the stream of fuel supplied by the anode ejector is no greater than eleven percent. Other corresponding methods in accordance with the disclosures herein are also contemplated.

Among other advantages, the present disclosures provide for fuel cell systems that include fuel cell stacks configured for in-block reforming. The fuel cell systems include pre-reformers where incoming fuel is pre-reformed to remove higher hydrocarbons, and the remainder of the fuel is reformed directly in the fuel cell stack without the need for an external reformer. In this manner, the difference between the fuel cell stack (cathode) air temperature at the outlet of the fuel cell stack and the inlet of the fuel cell stack is significantly reduced. As a result, the temperature of the fuel incoming to the fuel cell stack inlet is increased. In addition, the temperature of the fuel exiting the fuel cell stack is decreased, thus reducing fuel cell stack exit degradation. Another advantage is a more uniform current distribution within the fuel cell stack, resulting in a longer lasting fuel cell stack. For example, the internal electrical resistance of the fuel cell varies with temperature. As such, the amount of current a fuel cell can deliver varies with temperature. A more uniform temperature throughout the fuel cell stack would mean all cells have a narrower range of internal resistance and therefore would produce a narrower range of currents. This is an advantage at least because the fuel cell stack tends to degrade based on how much current is drawn. If some fuel cells degrade faster than others, the fuel cell stack may reach its end-of-life condition although some cells still remain useful. There are also cost advantages to this system, as there is no need for an external reformer in the fuel cell system. Other advantages of the present subject matter will be readily apparent to one skilled in the art to which the disclosure pertains from a perusal of the claims, the appended drawings, and the following detail description of the embodiments.

DETAILED DESCRIPTION

Figure 1:
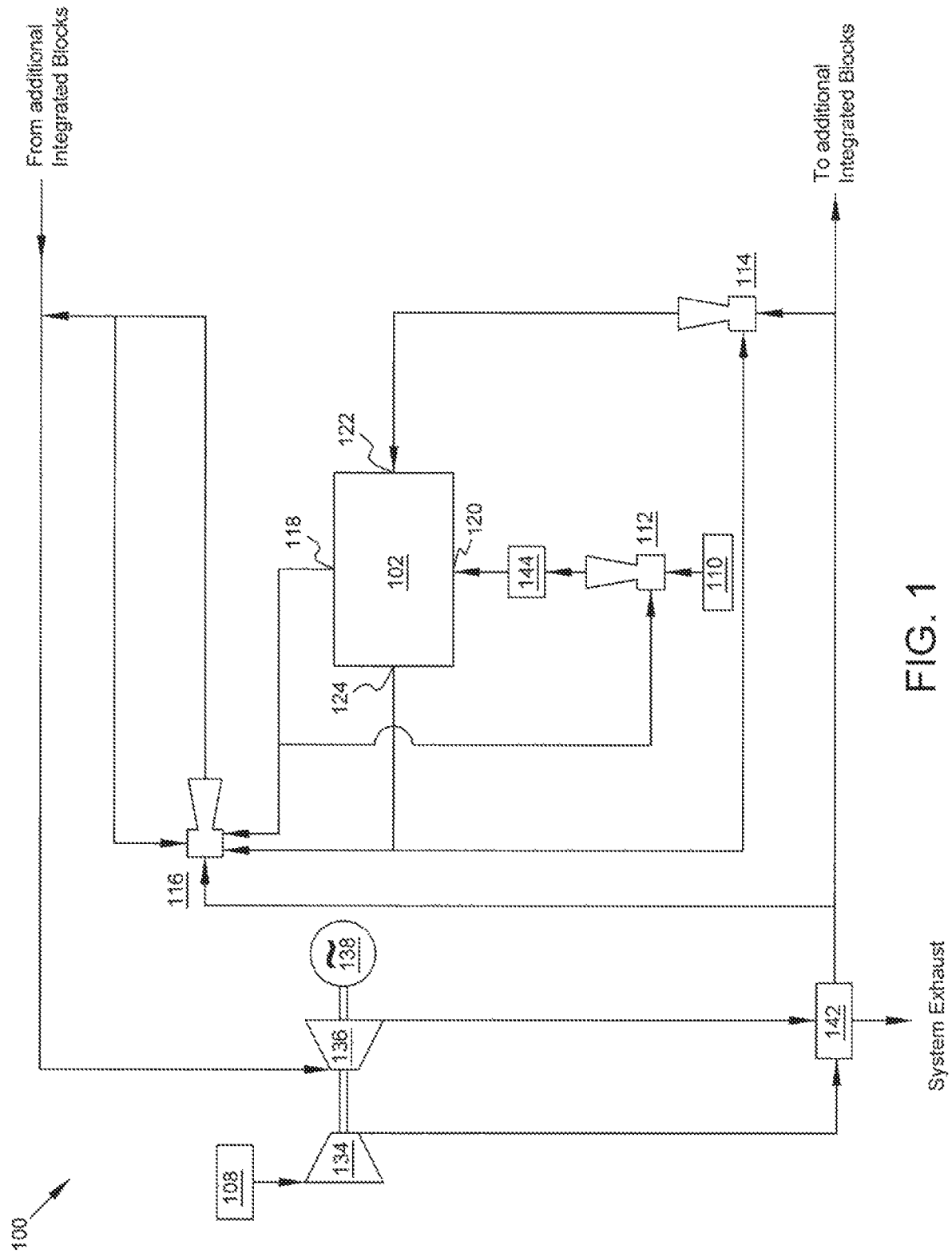
FIG. 1 illustrates a fuel cell system in accordance with some embodiments of the present disclosure.

While the present disclosure is susceptible to various modifications and alternative forms, specific embodiments have been shown by way of example in the drawings and will be described in detail herein. The objectives and advantages of the claimed subject matter will become more apparent from the following detailed description of the preferred embodiments thereof in connection with the accompanying drawings. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

FIG. 1 illustrates a fuel cell system 100 that includes a fuel cell stack 102, an oxidant source 108, a fuel source 110, an anode ejector 112 (also referred to as a fuel ejector), a cathode ejector 114 (also referred to as an oxidant ejector), a pre-reformer 144, and an auxiliary ejector 116. The system includes IBR of fuel. For example, in some examples all fuel reforming (i.e., 100%) occurs in the fuel cell stack 102. The IBR may include dry or wet reforming. The fuel cell system 100 may also include auxiliary equipment and components.

In this example, the fuel cell system 100 includes a compressor 134, a turbine 136, a generator 138, and a recuperator 142.

The fuel cell stack 102 may include a plurality of individual fuel cells (not shown). The individual fuel cells may each comprise an anode, a cathode, and an electrolyte. The fuel cell stack 102 may also include a fuel supply manifold 120 (also known as a fuel inlet manifold) that is configured to receive a stream of fuel from the pre-reformer 144.

The fuel cell stack 102 may also include a fuel exhaust manifold 118 configured to expel (e.g., vent) fuel exhaust, inter alia, unused fuel (e.g., fuel that has been reformed (reformate)), fuel cell reaction products, or both from the fuel stack 102. The fuel exhaust may be supplied to the suction of the anode ejector 112, suction of the auxiliary ejector 116, or other auxiliary equipment such as, e.g., a combustor (not shown). The fuel exhaust manifold 118 may also be configured to expel fuel exhaust to the environment, or may be configured to supply or expel the fuel exhaust using any combination of these options.

Anode ejector 112 can receive a source of fuel from fuel source 110, and can also receive fuel exhaust from the fuel exhaust manifold 118 from fuel cell stack 102 that is recycled back to the anode ejector 112 as mentioned above. The anode ejector 112 is configured to supply the fuel to the pre-reformer 104. In some examples, anode ejector 112 is configured to supply fuel based on a high recycle ratio. For example, the anode ejector 112 may be configured to supply fuel based on a recycle ratio in the range of 7.5 to 15. In some examples, the anode ejector 112, based on the recycle ratio it is configured for, supplies fuel to the pre-reformer with less than 11% methane.

The pre-reformer 144 can be disposed between the outlet of anode ejector 112 and the fuel supply manifold 120. The pre-reformer 144 functions to remove higher hydrocarbons from the stream of fuel from the outlet of the anode ejector 112, and any higher hydrocarbons that may exist in the fuel exhaust recycled to the anode ejector 112. The pre-reformer 144 may be an adiabatic catalytic converter capable of removing the higher hydrocarbons with no heat input other than the heat from the fuel from source 110 and that recycled from the fuel exhaust 118.

In some examples fuel source 110 provides desulfurized natural gas to anode ejector 112. Methane gas that may exit anode ejector 112 is converted to synthesis gas in fuel cell stack 102 through steam reforming. The resultant synthesis gas is converted to carbon dioxide and water through the electrochemical process of fuel cell stack 102.

The fuel cell stack 102 may also include an oxidant supply manifold 122 (which may be referred to as an oxidant inlet manifold) and an oxidant exhaust manifold 124. The oxidant supply manifold 122 is configured to receive an oxidant from the cathode ejector 114. The cathode ejector 114 is also configured to receive oxidant which is exhausted from the oxidant exhaust manifold 124 of the fuel cell stack 102. The cathode ejector 114 is further configured to provide the received oxidant to the plurality of cathodes in the fuel cell stack 102.

The oxidant exhaust manifold 124 may be configured to exhaust the oxidant from the fuel cell stack 102 for delivery to one or more of the suction side of cathode ejector 114, the suction side of auxiliary ejector 116, or some other component such as, e.g., a combustor (not shown). The oxidant exhaust manifold 124 may also be configured to vent the oxidant to the environment, or may be configured to exhaust or vent the oxidant in any combination of these options.

The oxidant exhaust which is supplied to the suction side of the cathode ejector 114 flows through a portion of a cathode loop. In this example, the cathode loop consists of the flow path of oxidant from the cathode ejector 114 into the oxidant supply manifold 122 from which the oxidant is supplied to the cathodes in the fuel cell stack 102, exhausted out the oxidant exhaust manifold 124, and back to the suction of the cathode ejector 114. As can be seen, the cathode loop is not a closed system because oxidant is allowed to enter the loop from oxidant supply 108 and to exit the loop via the suction of ejector 116. For example, in some embodiments the cathode loop may be considered to include the oxidant source 108 and the additional components shown between the oxidant source 108 and the fuel cell stack 102. Additionally, in some examples the cathode loop may include a flow of oxidant that is ionized and diffused through one or more fuel cell electrolytes of fuel cell stack 102.

A combustor (not shown), which can be integral to the auxiliary ejector 116, can be supplied with fresh oxidant which may provide the energy used to power auxiliary ejector 116. The auxiliary ejector 116 may draw in a portion of fuel exhaust from the fuel exhaust manifold 118, a portion of the oxidant from the oxidant exhaust manifold 124, and may also draw in combustion gases produced by auxiliary ejector 116.

In this example, a portion of fuel cell system 100 includes an anode loop. The anode includes the flow path of fuel from the pre-reformer 144 into the fuel inlet manifold 120, out of the fuel exhaust manifold 118, into the anode ejector 112, and back into the pre-reformer 144. The anode loop may also include the flow path of fuel from fuel source 110 into anode ejector 112.

The fuel source 110 may be a source of fuel such as a hydrocarbon fuel, desulfurized natural gas, or any other type of fuel. The oxidant source 108 may include storage tanks filled with an oxidant such as, e.g., pure oxygen, atmospheric air, or other oxidant source, or a system designed to generate a supply of oxidant.

As noted above, fuel cell system 100 includes compressor 134, turbine 136, generator 138, and recuperator 142. The recuperator 142 can be supplied with oxidant from the compressor 134 for a set of cold-side channels therein. Similarly, the recuperator 142 can be supplied with the exhaust of the turbine 136 to a set of hot-side channels. The recuperator 142 is upstream of the cathode ejector 114 and the auxiliary ejector 116, and functions to transfer heat between the turbine 136 exhaust and the oxidant supplied by the compressor 134.

Generator 138 can supply electrical power to turbine 136. The turbine 136 drives the compressor 134 and the generator 138, and can receive the combustion products from, e.g., auxiliary ejector 116. The combustion products may expand as they traverse through the turbine 136. The turbine 136 exhaust can be supplied to the recuperator 142 to effect a heat transfer therein prior to being exhausted to the atmosphere. The turbine 136 may also be configured to vent the exhaust to the atmosphere.

Compressor 134 can be disposed downstream from the supply of oxidant 108. The compressor 134 may draw-in and compress the oxidant that is used to drive the cathode ejector 114 and auxiliary ejector 116. In this example, compressor 134 is configured to provide the compressed oxidant to recuperator 142.

In some embodiments, the fuel cell system 100 may be one of a plurality of integrated fuel cell systems. As can be seen on the right hand side of FIG. 1, the right-pointing arrow beneath the cathode ejector 114 and labeled as "To Additional Integrated Blocks" indicates that the oxidant may flow toward another integrated fuel cell system to supply oxidant to the cathode ejector and auxiliary ejector of that system. In such an embodiment, the compressor 134 may provide compressed oxidant for the plurality of integrated fuel cell systems. Similarly, and as indicated by the arrow labeled "From Additional Integrated Blocks," the exhaust from auxiliary ejector 116 can be supplied to a common exhaust header which feeds into turbine 136. In some embodiments, multiple turbines and compressors may be used among the plurality of integrated fuel cell systems.

Figure 2:
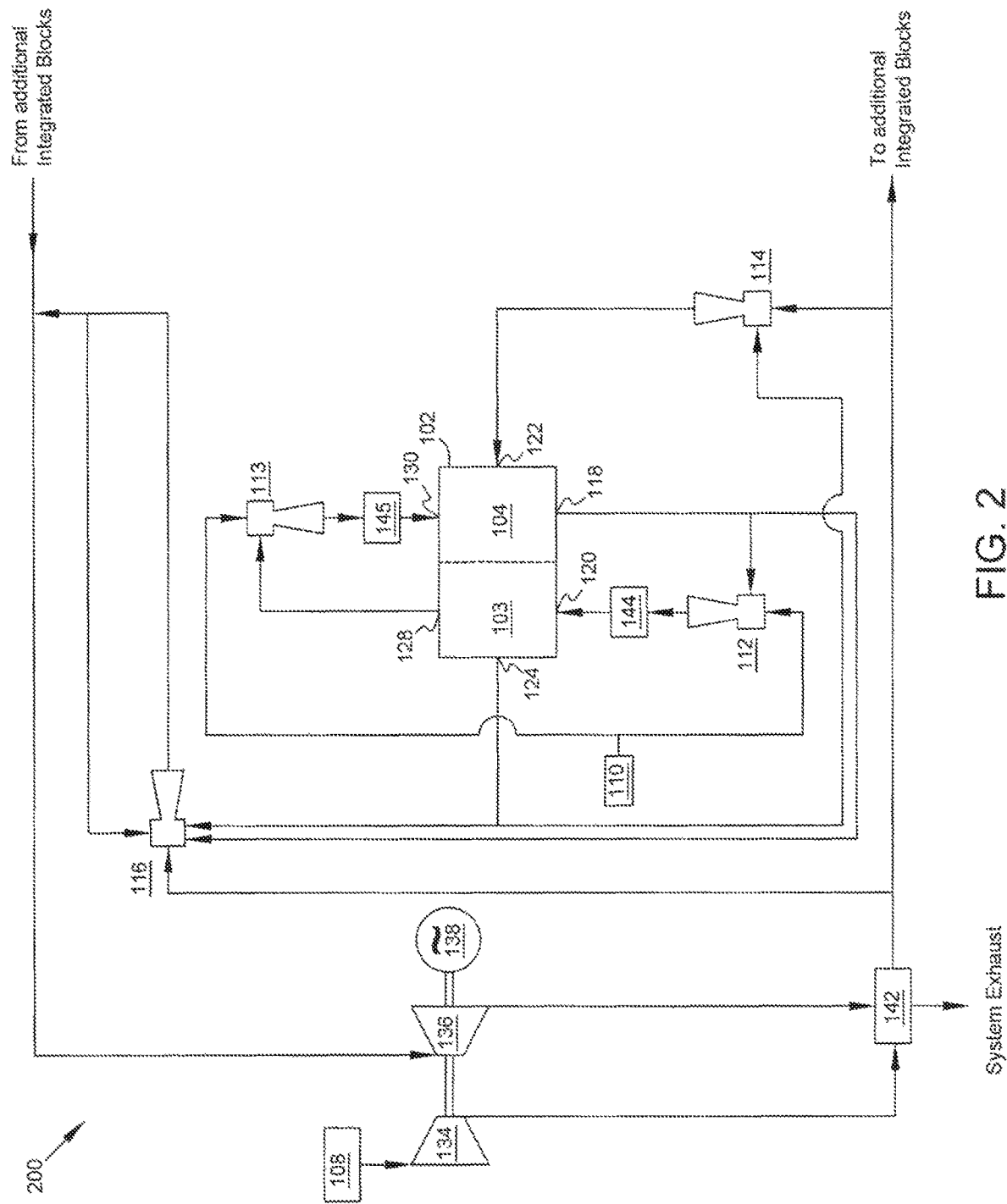
FIG. 2 illustrates another fuel cell system in accordance with some embodiments of the present disclosure.

FIG. 2 illustrates a fuel cell system 200 that includes similar components as those described above with respect to FIG. 1. Similar to the fuel cell system 100 of FIG. 1, the system includes IBR of fuel. For example, in some examples all fuel reforming occurs in the fuel cell stack 102. In this example, however, fuel cell stack 102 includes two compartments, namely, a first compartment 103 and a second compartment 104. The fuel cell system 200 also includes two anode ejectors including anode ejector 112 and anode ejector 113, as well as two pre-reformers including pre-reformer 144 and pre-reformer 145.

Anode ejector 112 can receive a source of fuel from fuel source 110, and can also receive fuel exhaust from a fuel exhaust manifold 118 from compartment 104 of fuel cell stack 102. The anode ejector 112 is configured to supply the fuel to the pre-reformer 144.

The pre-reformer 144 can be disposed between the outlet of anode ejector 112 and the fuel supply manifold 120 of compartment 103 of fuel cell stack 102. The pre-reformer 144 functions to remove higher hydrocarbons from the stream of fuel from the outlet of the anode ejector 112, and any higher hydrocarbons that may exist in the fuel exhaust recycled to the anode ejector 112. The pre-reformer 144 supplies the stream of fuel to the fuel supply manifold 120 of compartment 103 of fuel cell stack 102.

Similarly, anode ejector 113 can receive a source of fuel from fuel source 110, and can also receive fuel exhaust from a fuel exhaust manifold 128 from compartment 103 of fuel cell stack 102. The anode ejector 113 is configured to supply the fuel to the pre-reformer 145.

The pre-reformer 145 can be disposed between the outlet of anode ejector 113 and the fuel supply manifold 130 of compartment 14 of fuel cell stack 102. The pre-reformer 145 functions to remove higher hydrocarbons from the stream of fuel from the outlet of the anode ejector 113, and any higher hydrocarbons that may exist in the fuel exhaust recycled to the anode ejector 113. The pre-reformer 145 supplies the stream of fuel to the fuel supply manifold 130 of compartment 104 of fuel cell stack 102

In some examples fuel source 110 provides desulfurized natural gas to both anode ejector 112 and anode ejector 113. Methane that may exit anode ejector 112 is converted to synthesis gas in compartment 103 of fuel cell stack 102 through steam reforming. The resultant synthesis gas is converted to carbon dioxide and water through the electrochemical process of the fuel cell stack 102. Similarly, all methane that may exit anode ejector 113 is converted to synthesis gas in compartment 104 of fuel cell stack 102 through steam reforming. The resultant synthesis gas is converted to carbon dioxide and water through the electrochemical process of the fuel cell stack 102. As such, the use of two anode ejectors in this example allows for the delivery of fuel to fuel cell stack 102 with a lower methane concentration than in some systems that may use just one anode ejector. In some examples, the anode ejectors combine to deliver fuel with a methane concentration of no more than 11%.

Figure 3:
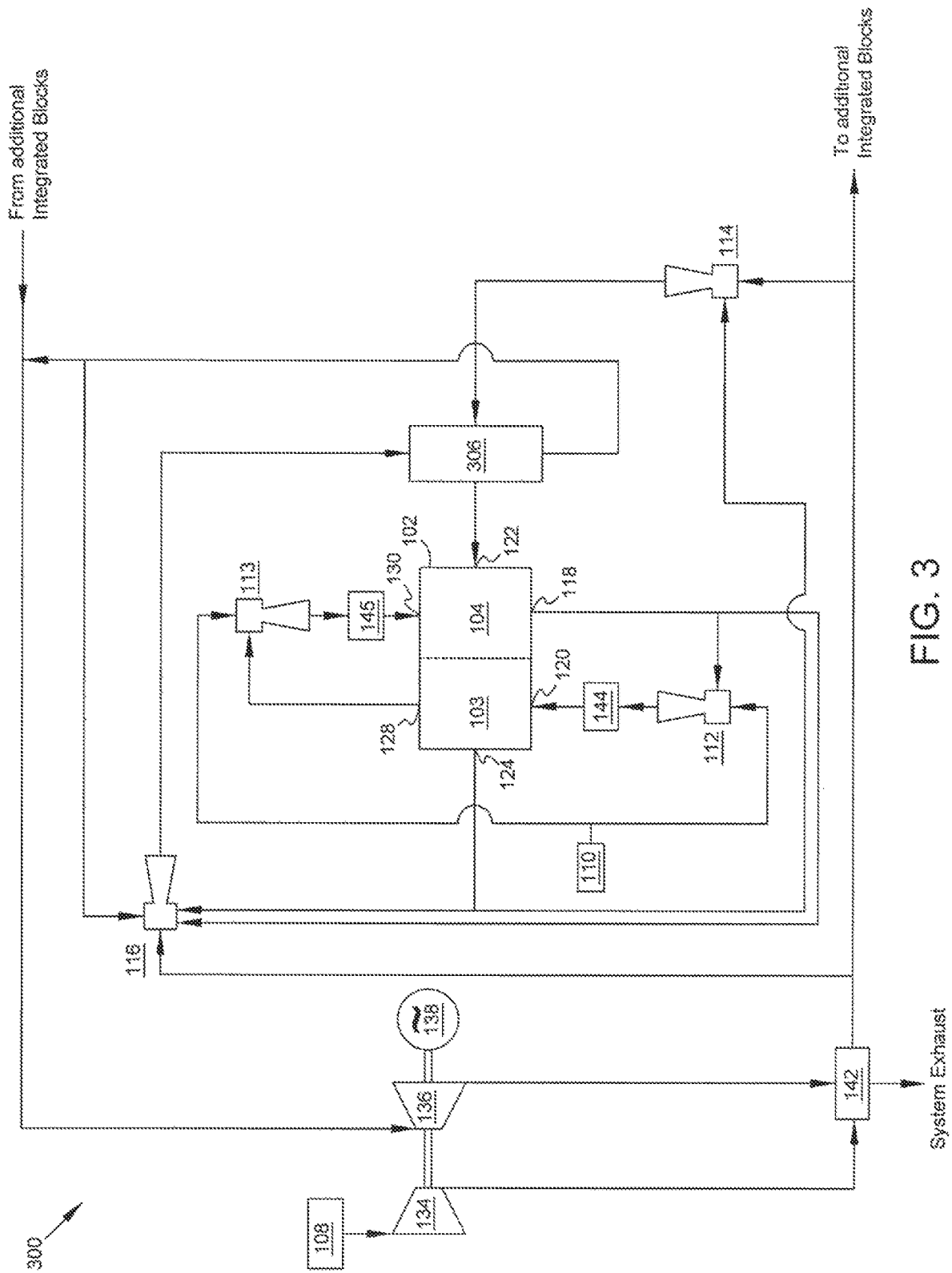
FIG. 3 illustrates yet another fuel cell system in accordance with some embodiments of the present disclosure.

FIG. 3 illustrates a fuel cell system 300 similar to the fuel cell system 200 of FIG. 2, but also includes heat exchanger 306. In this example, prior to flowing into the oxidant supply manifold 122 of fuel cell stack 102, the oxidant flows through cold-side channels of heat exchanger 306. In this example, the cathode ejector 114 is configured to receive fresh oxidant from the source of oxidant 108, and supplies the oxidant to the hot-side channels of heat exchanger 306.

The hot side channels of heat exchanger 306 are supplied with a source of hot fluid such as, in this example, the exhaust from auxiliary ejector 116. In other examples, another warm fluid may be used. For example, the warm fluid may be combustion products from a combustor that may be integrated into the auxiliary ejector 116 and combusts a portion of fuel exhaust from the anodes of the fuel cell stack 102, the oxidant exhaust from the cathodes of the fuel cell stack 102, oxidant from the compressor 134, or a combination of these fluids. After passing through the hot side channels of the heat exchanger 306, the warm fluid can be supplied to the suction side of the auxiliary ejector 116, as in this example. In some examples, the warm fluid can be vented out to the environment.

Figure 4:
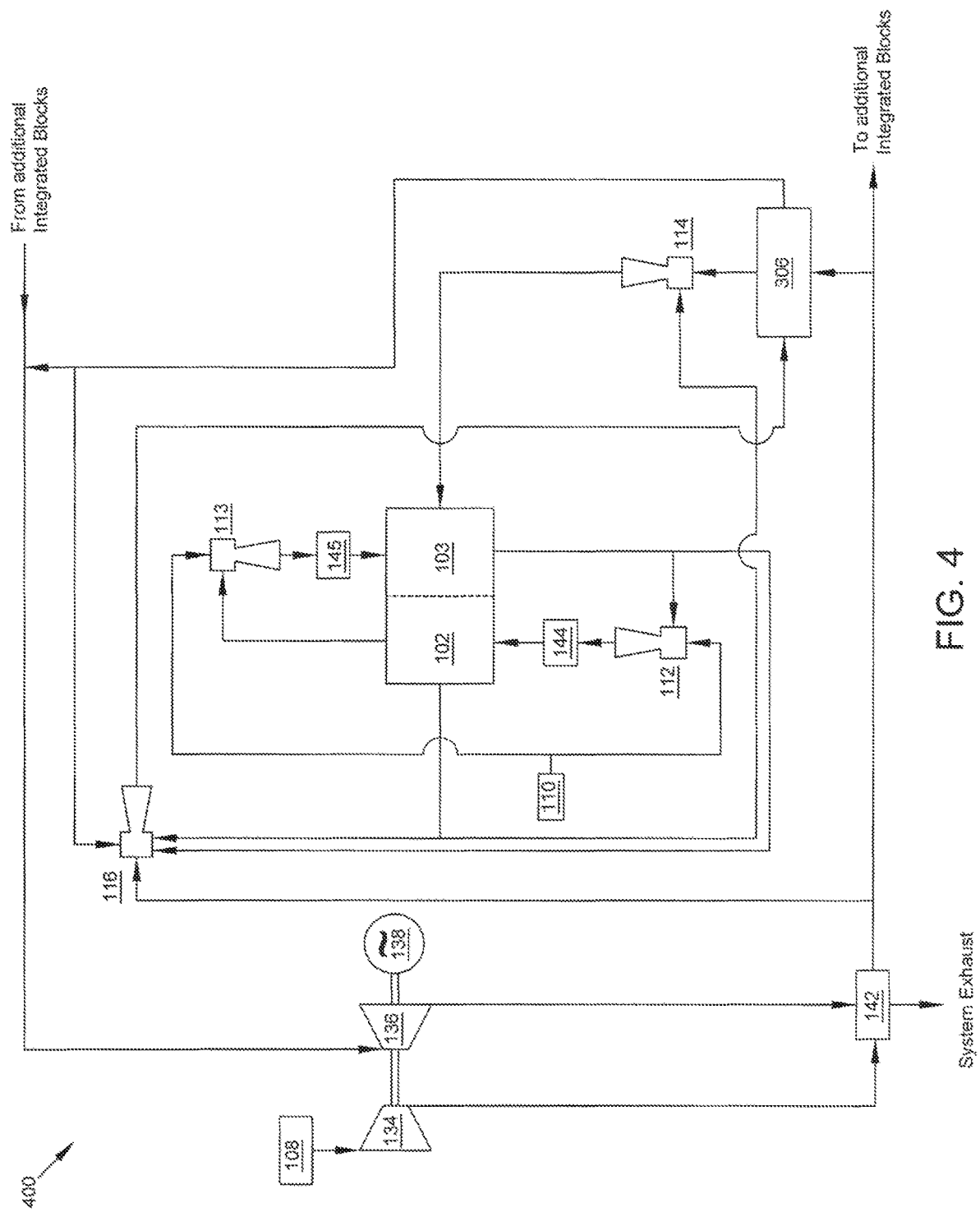
FIG. 4 illustrates yet another fuel cell system in accordance with some embodiments of the present disclosure.

FIG. 4 illustrates a fuel cell system 400 that is similar to the fuel cell system 300 of FIG. 3. In this example, however, the heat exchanger 306 is downstream, rather than upstream, of cathode ejector 114. As such, in this example, the cold-side channels of heat exchanger 306 receive oxidant from oxidant supply 108. After passing through heat exchanger 306, the oxidant is provided to cathode ejector 114. As in the fuel cell system 300 of FIG. 3, the hot side channels of heat exchanger 306 are supplied with a source of hot fluid such as, in this example, the exhaust from auxiliary ejector 116. After passing through the hot side channels of the heat exchanger 306, the warm fluid can be supplied to the suction side of the auxiliary ejector 116, as in this example. In some examples, the warm fluid can be vented out to the environment.

Among other advantages, the present disclosures provide for fuel cell systems that include fuel cell stacks configured for in-block reforming. The fuel cell systems include pre-reformers where incoming fuel is pre-reformed to remove higher hydrocarbons, and the remainder of the fuel is reformed directly in the fuel cell stack without the need for an external reformer. In this manner, the difference between the fuel cell stack (cathode) air temperature at the outlet of the fuel cell stack and the inlet of the fuel cell stack is significantly reduced. As a result, the temperature of the fuel incoming to the fuel cell stack inlet is increased. In addition, the temperature of the fuel exiting the fuel cell stack is decreased, thus reducing fuel cell stack exit degradation. Another advantage is a more uniform current distribution within the fuel cell stack, leading to a longer lasting fuel cell stack. There are also cost advantages to this system, as there is no need for an external reformer in the fuel cell system. Other advantages of the present subject matter will be readily apparent to one skilled in the art to which the disclosure pertains from a perusal of the claims, the appended drawings, and the following detail description of the embodiments.

While preferred embodiments of the present subject matter have been described, it is to be understood that the embodiments described are illustrative only and that the scope of the subject matter is to be defined solely by the appended claims when accorded a full range of equivalence, and the many variations and modifications naturally occurring to those of skill in the art from a perusal hereof.

We claim:

1. A system comprising:
   a fuel cell block comprising:
      a fuel cell stack comprising a plurality of solid oxide fuel cells, each solid oxide fuel cell comprising an anode, a cathode, and an electrolyte;
      an in-block fueling flowpath comprising a first and second fuel supply manifolds, a first and second fuel exhaust manifolds, and one or more fueling channels in fluid communication with said first and second fuel supply manifolds and each respective first and second said fuel exhaust manifold, wherein each anode is exposed to a fuel flowing in one or more of said fueling channels; and
      an in-block oxidizing flowpath comprising an oxidant supply manifold, an oxidant exhaust manifold, and one or more oxidizing channels in fluid communication with said oxidant supply manifold and said oxidant exhaust manifold, wherein each cathode is exposed to an oxidant flowing in one or more oxidizing channels;
   an out-of-block oxidant flowpath comprising:
      a cathode ejector having an oxidant supply input, an oxidant recycle input, and a combined oxidant output;
      an oxidant supply conduit in fluid communication with said cathode ejector oxidant supply input;
      an oxidant source in fluid communication with said oxidant supply conduit;
      an oxidant recycle conduit in fluid communication with said cathode ejector oxidant recycle input and said in-block oxidizing flowpath oxidant exhaust manifold; and
      a combined oxidant supply conduit in fluid communication with said cathode ejector combined oxidant output and said in-block oxidizing flowpath oxidant supply manifold;
   an out-of-block fuel flowpath comprising:
      a first anode ejector having a first fuel supply input, a first fuel recycle input, and a first combined fuel output;
      a second anode ejector having a second fuel supply input, a second fuel recycle input, and a second combined fuel output;
      a fuel supply conduit in fluid communication with each said first and second anode ejector fuel supply input;
      a source of fuel in fluid communication with said fuel supply conduit;
      a first and second fuel recycle conduits in fluid communication with each respective said first and second anode ejector fuel recycle input and each respective said first and second in-block fueling flowpath fuel exhaust manifold;
      a first and second combined fuel supply conduits in fluid communication with each respective said first and second anode ejector combined fuel output and said in-block fueling flowpath fuel supply manifold, wherein said out-of-block fuel flowpath and said in-block fueling flowpath are configured to effect a recycle ratio in the range of 4.5 to 15 of a mass of fuel flowing into each said first and second anode ejector fuel recycle input to a mass of fuel flowing into each said first and second anode ejector fuel supply input, and a first pre-reformer between the first anode ejector and the first fuel supply manifold and a second pre-reformer between the second anode ejector and the second fuel supply manifold, each first and second pre-reformer located in a flowpath provided by said out-of-block fuel flowpath combined fuel supply conduit, wherein at least one of said first and second pre-former is an adiabatic catalytic converter configured to remove higher hydrocarbons from the fuel;

an out-of-block auxiliary flowpath comprising:
an auxiliary ejector having an oxidant supply input, a fuel exhaust input, an oxidant exhaust input, a recycle input, and an output;
an auxiliary ejector oxidant supply conduit in fluid communication with said auxiliary ejector oxidant supply input and said oxidant source;
an auxiliary ejector fuel exhaust conduit in fluid communication with said auxiliary ejector fuel exhaust input and said in-block fueling flowpath fuel exhaust manifold;
an auxiliary ejector oxidant exhaust conduit in fluid communication with said auxiliary ejector oxidant exhaust input and said in-block oxidizing flowpath oxidant exhaust manifold;
an auxiliary exhaust conduit in fluid communication with said auxiliary ejector output; and
an auxiliary ejector recycle conduit in fluid communication with said auxiliary ejector recycle input and said auxiliary exhaust conduit, and
a recuperator located upstream of the cathode ejector and the auxiliary ejector, and functioning to transfer heat between a turbine exhaust and an oxidant supplied by a compressor.

2. The system of claim 1 wherein said out-of-block fuel flowpath and said in-block fueling flowpath are configured to effect a ratio in the range of 6 to 8 of a mass of fuel flowing into each said first and second anode ejector fuel recycle input to a mass of fuel flowing into each said first and second anode ejector fuel supply input.

3. The system of claim 2 wherein said out-of-block fuel flowpath and said in-block fueling flowpath are configured to effect a ratio of about 7.5 of a mass of fuel flowing into each said first and second anode ejector fuel recycle input to a mass of fuel flowing into each said first and second anode ejector fuel supply input.

4. The system of claim 1 wherein said out-of-block fuel flowpath and said in-block fueling flowpath are configured to effect a weight percent of methane in a fluid flowing into said in-block fueling flowpath fuel supply manifold of no greater than eleven percent.

5. The system of claim 1 further comprising a combustor in a flowpath provided by said auxiliary exhaust conduit.

6. The system of claim 5 further comprising a heat exchanger for transferring thermal energy between a fluid output of said combustor and a fluid flowing in said combined oxidant supply conduit.

7. The system of claim 5 further comprising a heat exchanger for transferring thermal energy between a fluid output of said combustor and a fluid flowing in said out-of-block oxidant flowpath oxidant supply conduit.

8. A system comprising:
a fuel cell block comprising:
a fuel cell stack comprising a first and a second segment, each segment comprising a plurality of solid oxide fuel cells, each solid oxide fuel cell comprising an anode, a cathode, and an electrolyte;
a first in-block fueling flowpath comprising a first fuel supply manifold, a first fuel exhaust manifold, and one or more first fueling channels in fluid communication with said first fuel supply manifold and said first fuel exhaust manifold, wherein each anode in said first segment is exposed to a fuel flowing in one or more of said first fueling channels;
a second in-block fueling flowpath comprising a second fuel supply manifold, a second fuel exhaust manifold, and one or more second fueling channels in fluid communication with said second fuel supply manifold and said second fuel exhaust manifold, wherein each anode in said second segment is exposed to a fuel flowing in one or more of said second fueling channels; and
an in-block oxidizing flowpath comprising an oxidant supply manifold, an oxidant exhaust manifold, and one or more oxidizing channels in fluid communication with said oxidant supply manifold and said oxidant exhaust manifold, wherein each cathode in said first and second segments is exposed to an oxidant flowing in one or more oxidizing channels;
an out-of-block oxidant flowpath comprising:
a cathode ejector having an oxidant supply input, an oxidant recycle input, and a combined oxidant output;
an oxidant supply conduit in fluid communication with said cathode ejector oxidant supply input;
an oxidant source in fluid communication with said oxidant supply conduit;
an oxidant recycle conduit in fluid communication with said cathode ejector oxidant recycle input and said in-block oxidizing flowpath oxidant exhaust manifold; and
a combined oxidant supply conduit in fluid communication with said cathode ejector combined oxidant output and said in-block oxidizing flowpath oxidant supply manifold;
a first out-of-block fuel flowpath comprising:
a first anode ejector having a fuel supply input, a fuel recycle input, and a combined fuel output;
a first fuel supply conduit in fluid communication with said first anode ejector fuel supply input;
a source of fuel in fluid communication with said first fuel supply conduit;
a first fuel recycle conduit in fluid communication with said first anode ejector fuel recycle input and said second in-block fueling flowpath fuel exhaust manifold; and
a first combined fuel supply conduit in fluid communication with said first anode ejector combined fuel output and said first in-block fueling flowpath fuel supply manifold;
a second out-of-block fuel flowpath comprising:
a second anode ejector having a fuel supply input, a fuel recycle input, and a combined fuel output;
a second fuel supply conduit in fluid communication with said second anode ejector fuel supply input;
a source of fuel in fluid communication with said second fuel supply conduit;
a second fuel recycle conduit in fluid communication with said second anode ejector fuel recycle input and said first in-block fueling flowpath fuel exhaust manifold;
a second combined fuel supply conduit in fluid communication with said second anode ejector combined fuel output and said second in-block fueling flowpath fuel supply manifold, and a first pre-reformer between the first anode ejector and the first fuel supply manifold and a second pre-reformer between the second anode ejector and the second fuel supply manifold, each first and second pre-reformer located in said second out-of-block fuel flowpath provided by said second out-of-block fuel flowpath combined fuel supply conduit, wherein at least one of said first and second pre-former is an adiabatic catalytic converter configured to remove higher hydrocarbons from the fuel, wherein each of said first and second out-of-block fuel flowpaths and said first and second in-block fueling flowpaths are configured to effect a recycle ratio in the range of 4.5 to 15 of a mass of fuel flowing into each of said first and second anode ejector fuel recycle inputs to a mass of fuel flowing into each of said respective first and second anode ejector fuel supply inputs;

an out-of-block auxiliary flowpath comprising:

an auxiliary ejector having an oxidant supply input, a fuel exhaust input, an oxidant exhaust input, a recycle input, and an output;

an auxiliary ejector oxidant supply conduit in fluid communication with said auxiliary ejector oxidant supply input and said oxidant source;

an auxiliary ejector fuel exhaust conduit in fluid communication with said auxiliary ejector fuel exhaust input and said first in-block fueling flowpath fuel exhaust manifold;

an auxiliary ejector oxidant exhaust conduit in fluid communication with said auxiliary ejector oxidant exhaust input and said second in-block oxidizing flowpath oxidant exhaust manifold;

an auxiliary exhaust conduit in fluid communication with said auxiliary ejector output; and an auxiliary ejector recycle conduit in fluid communication with said auxiliary ejector recycle input and said auxiliary exhaust conduit and a recuperator located upstream of the cathode ejector and the auxiliary ejector, and functioning to transfer heat between a turbine exhaust and an oxidant supplied by a compressor.

9. The system of claim 8 wherein said first out-of-block fuel flowpath and said second out-of-block fuel flowpath and said first and second in-block fueling flowpath are configured to effect a recycle ratio in the range of 6 to 8 of a mass of fuel flowing into each of said first and second anode ejector fuel recycle inputs to a mass of fuel flowing into each of said respective first and second anode ejector fuel supply inputs.

10. The system of claim 9 wherein said first out-of-block fuel flowpath and said second out-of-block fuel flowpath and said first and second in-block fueling flowpath are configured to effect a recycle ratio of about 7.5 of a mass of fuel flowing into each of said first and second anode ejector fuel recycle inputs to a mass of fuel flowing into each of said respective first and second anode ejector fuel supply inputs.

11. The system of claim 8 wherein said first out-of-block fuel flowpath and said second out-of-block fuel flowpath and said first and second in-block fueling flowpath are configured to effect a weight percent of methane in a fluid flowing into said first in-block fueling flowpath fuel supply manifold and said second in-block fueling flowpath fuel supply manifold of no greater than eleven percent.

12. The system of claim 8 further comprising a combustor in a flowpath provided by said auxiliary exhaust conduit.

13. The system of claim 12 further comprising a heat exchanger for transferring thermal energy between a fluid output of said combustor and a fluid flowing in said combined oxidant supply conduit.

14. The system of claim 12 further comprising a heat exchanger for transferring thermal energy between a fluid output of said combustor and a fluid flowing in said out-of-block oxidant flowpath oxidant supply conduit.

* * * * *